INVENTOR:
ERNST GFELLER

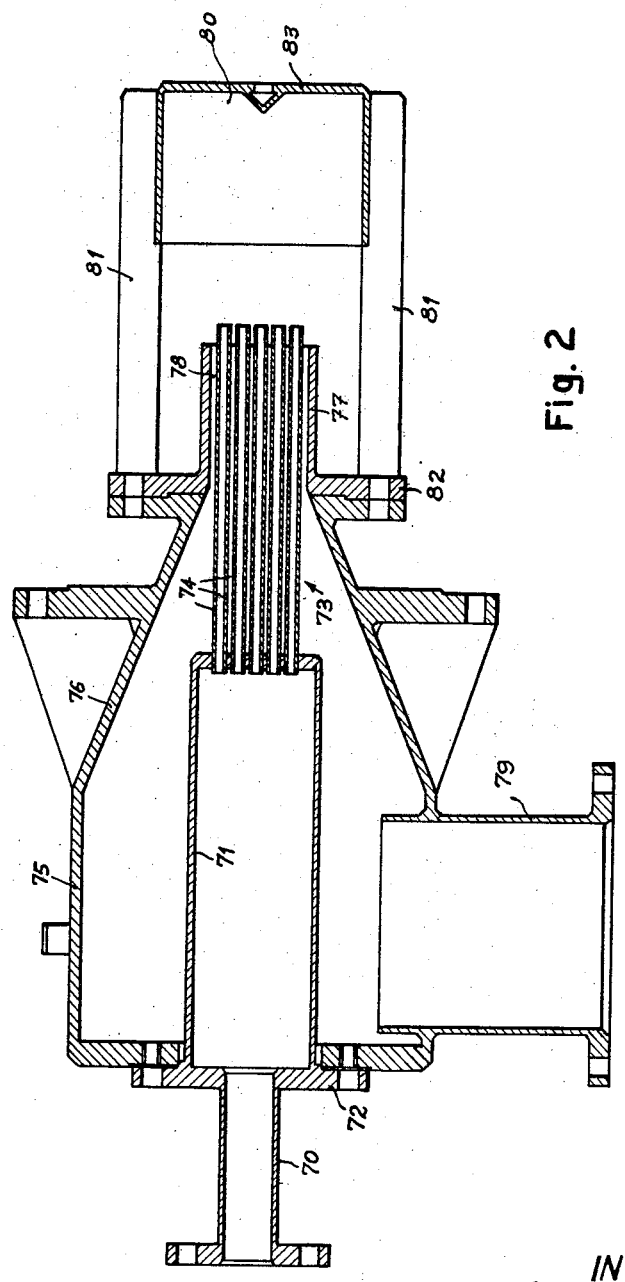

United States Patent Office 3,089,755
Patented May 14, 1963

3,089,755
APPARATUS FOR TREATING OILS AND FATS
Ernst Gfeller, Augstmattstrasse 10, Pratteln, near Basel, Switzerland
Filed May 26, 1958, Ser. No. 737,861
Claims priority, application Switzerland May 28, 1957
3 Claims. (Cl. 23—260)

The present invention relates to an apparatus for the selective hardening of unsaturated vegetable and animal oils and fats. According to the invention, it is intended to make possible effective control of hardening and at the same time great selectivity of hardening.

It has already been proposed to circulate a mixture consisting of the material to be hydrogenated, in the liquid state, and a hydrogenation catalyst in closed circuit through a tank or vessel and a circulation pipe line. In this method, hydrogen gas is introduced into the circulation pipe line and the mixture consisting of material to be hydrogenated and catalyst is thoroughly mixed with hydrogen gas is effected in a mixing apparatus arranged in the circulation pipe line.

In order to increase the selectivity of the hardening process, it is necessary for the hydrogen to be absorbed by the double bonds of the higher unsaturated fatty acid esters of the fat mixture. The hydrogen must be uniformly distributed in low concentration throughout the volume of the material to be hydrogenated and be caused to react simultaneously at every point of the material. These requirements are substantially met in the process according to the invention. The process for selective hardening according to the invention is distinguished in that the material to be hardened and mixed with a catalyst is conveyed in longitudinal flow through an autoclave, while at the same time the treatment with hydrogen gas is carried out in cross-current.

The apparatus for carrying the process into effect comprises an autoclave divided into a plurality of chambers and through which the material to be treated is conducted in longitudinal flow, a circulation pipe by means of which the treatment of the material to be hardened with hydrogen gas is effected in cross-current or flow being connected to each chamber.

In this way, a selective treatment in stages is obtained. An example of embodiment of the apparatus is shown in the accompanying drawing, in which:

FIG. 2 is a sectional detail view of the mixing device.

Figure 1:
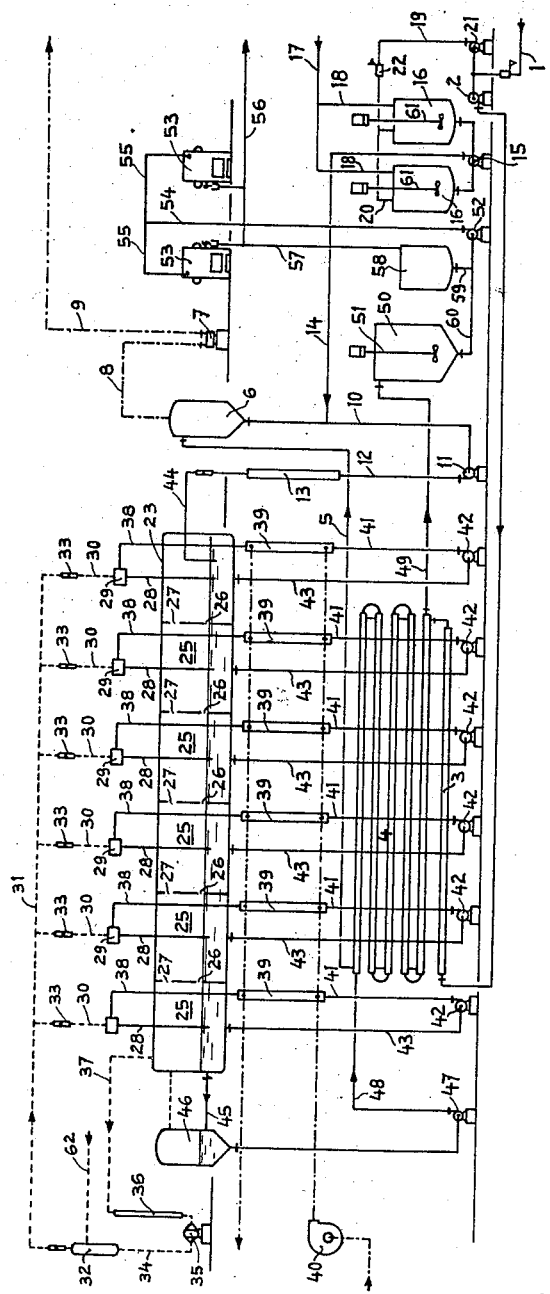
FIG. 1 is a diagrammatic illustration of the principle of the arrangement.

Referring to the accompanying drawings, there is shown a pipe line 1 through which the material to be treated, for example neutralized and bleached oil, is supplied to a feed pump 2. The pump 2 is in communication with a steam preheater 3 which is connected to a heat exchanger 4. From the heat exchanger 4 a pipe line 5 leads to a drying tank 6, in which the removal of water from the material to be treated is effected. To this end, the tank 6 is in communication with the vacuum pump 7. The connecting pipe is designated by the reference 8 and the vacuum pump 7 is also provided with an air pipe 9. From the tank 6 a pipe 10 leads to a dosing pump 11 which is provided at its pressure or delivery side with a pipe 12 opening into a steam heater 13.

Into the pipe 10 which connects the tank 6 to the pump 11 there opens a pipe 14 of a dosing pump 15 which is connected to two preparation vessels or tanks 16 for the catalyst. The catalyst is supplied through a pipe 17 having two branches 18 discharging into the vessels 16. Another pipe 19 provided with branch pipes 20 connects the two vessels 16 to a feed pump 21, a meter 22 being installed in the pipe 19.

23 designates an autoclave which extends in the longitudinal direction and is divided by partition walls 24 into chambers or compartments 25. The walls 24 are provided with apertures 26 which permit the passage of the oil from one chamber to the other when the oil level has reached a certain height. Further apertures 27 are provided in the upper part of the walls.

A separate circulation pipe is connected to each chamber 25. Each of the circulation pipes has a level pipe 28 which extends into the chamber from above, the mouth of the pipe being disposed somewhat below the level determined by the openings 26. Each of the level pipes 28 is in communication with a mixing device 29, the mixing devices being intended for supplying the hydrogen gas. A pipe 30 leads from each of the mixing devices 29 to a collecting pipe or manifold 31 which is in communication with a hydrogen tank 32. Measuring devices 33 which measure the quantity of hydrogen gas flowing through them are installed in the pipes 30. The tank 32 is connected by a pipe 34 to a compressor 35 which is in communication on the suction side by way of a cooler 36 and through a pipe 37 with the upper space of the autoclave 23. A pipe 62 serves to supply hydrogen to the tank 32.

The construction of a mixing device 29 is shown in FIG. 2. The hydrogen feed pipe 30 is connected to a connection 70 which is flanged at one end to a pipe 71 at 72. At the other end of the pipe 71 there is provided a nest or set of tubes 73 which is composed of a number of small tubes 74 of small diameter. The nest of tubes opens at one end into the pipe 71 and is connected to the pipe 71 at the point where it opens thereinto. The pipe 71 and the nest of tubes 73 are moreover enclosed by a jacket 75 which merges into a cone 76. The latter is flanged to a pipe 77 which so surrounds the nest of tubes 73 that a space 78 is left between the nest 73 and the pipe 77.

Furthermore, the jacket 75 is provided in the region of the pipe 71 with a flange part 79 connected to the oil pipe 38.

A mixing chamber 80 is arranged in front of that end of the nest of tubes 73 which is remote from the pipe 71, the mixing chamber being secured by bars 81 to the flange 82 of the pipe 77 and comprising an impact or impingement bottom 83.

The hydrogen flowing through the pipes 70, 71 and through the nest of tubes 73 impinges against the bottom 83 of the mixing chamber. The oil flowing through the flange part 79, the cone 76 and the pipe 77 likewise enters the mixing chamber 80 and impinges against the wall 83, so that the hydrogen and the oil are intensively and thoroughly mixed, whereby the reaction takes place.

A pipe 38 leads from each of the mixing devices 29 to an air cooler 39 through which a common fan 40 blows air. Each air cooler 39 is connected by a pipe 41 to an associated circulating pump 42, the pipe 41 being connected to the delivery side of the associated pump 42. The suction side of each pump 42 is connected by a pipe 43 to the bottom of the autoclave 23. The arrangement is such that with each chamber 25 there is associated a separate circulation pipe or line which is composed of the parts 28, 29, 38, 39, 41, 42 and 43.

The material to be treated is supplied through a pipe 44 which is connected to the steam heater 13. This pipe opens into the first chamber 25 of the autoclave 23. The last chamber 25 is provided with an extraction pipe 45 which connects this chamber to a control means 46 which effects the adjustment of the level. The control means 46 is in communication with a feed pump 47, the pressure side of which is connected by a pipe 48 to the heat exchanger 4. The said heat exchanger 4 is connected at one end by way of a pipe 49 to a tank 50 containing a stirring apparatus 51. This tank 50 is connected to a pump 52 the pressure side of which is in communication with two filter presses 53 and to this end a pipe 54, which is in communication with the filter presses 53 by way of two pipes 55, is connected to the pressure side of the pump 52. The outlets of the presses 53 are connected to a common pipe 56 by means of which the removal of the hardened oil is effected. Furthermore, a branch pipe 57 leads to an intermediate tank 58 which is connected by a pipe 59 to the pipe 60 leading from the pump 52 to the tank 50.

The apparatus described operates in the following manner:

Neutralized and bleached oil is supplied through the pipe 1 to the pump 2, which conveys the oil through the preheater 3 and the heat exchanger 4. The oil is heated in the preheater 3 and the heat exchanger 4, in that it absorbs heat from the hardened oil flowing through the heat exchanger 4 in the opposite direction. Through the pipe 5 the oil enters the drying tank 6. The latter is constructed as a vacuum chamber in which the oil is atomized. The air is sucked out of the tank 6 by the vacuum pump 7 by way of the pipe 8. After the oil has left the tank, a catalyst, for example nickel, is added to it. The preparation of the catalyst is carried out in the vessels 16, in which stirring apparatus 61 is provided. The catalyst is delivered by the dosing pump 15 through the pipe 14 to the pipe 10, through which the oil to be treated is sucked out of the tank 6 by the pump 11. The pump 11 conveys the oil, to which the catalyst has been added, through the pipe 12 and the steam heater 13 and also through the pipe 44 into the first chamber 25. In this chamber, the oil-catalyst mixture is put in circulation in cross flow. The pump 42 conveys the mixture through the pipe 41, air cooler 39 and pipe 38 through the mixing device 29. In this mixing device, hydrogen is added to the oil-catalyst mixture. The hydrogen gas is supplied to the mixing device 29 from the tank 32 through the pipe 31 and the pipe 30, the quantity of hydrogen gas being determined by a measuring device 33. Feeding of the tank 32 is effected through the pipe 62 and through the pipes 37 and 34 by means of the pump 35, in that the hydrogen which has collected in the upper part of the autoclave 23 is sucked off.

Thus, in the mixing device 29 hydrogen is fed to the oil-catalyst mixture, whereupon a reaction takes place between the oil-catalyst mixture and hydrogen, the reaction being dependent on the concentration of hydrogen, the quantity of catalyst and the temperature and pressure of the hydrogen. From the first chamber, the reaction mixture passes in longitudinal flow into the second and other chambers 25, in which the hardening is continued. In each chamber, the mixture is put in circulation in cross flow, whereby a selective hardening is obtained. The hydrogen which does not take part in the reaction accumulates in the upper part of the autoclave 23. The velocity with which oil is supplied to the autoclave, the number and size of the chambers and the velocity of circulation in cross flow are so adjusted to one another that each particle of the material to be treated is uniformly hardened.

The hardened material leaves the autoclave 23 through the pipe 45 and is fed by the pump 47 through the pipe 48 to the heat exchanger 4. Here the hardened oil is cooled and is then collected in the tank 50. From this tank 50, the pump 53 (sic) forces the hardened oil optionally into one of the filter presses 53, the feed being changed over to the other press when one of the presses 53 has been filled. The filter presses are provided with hydraulically actuated spindles and serve to recover the catalyst. The recovered catalyst is collected in the tank 58 and mixed with unhardened oil in one of the vessels 16.

In the apparatus described, the material to be hardened is conveyed in longitudinal flow through the autoclave, while the treatment with hydrogen gas is carried out in cross flow. The rate of supply of the oil to be hardened, the velocity of circulation and the ratio between oil, catalyst and hydrogen can be accurately controlled. The rate of supply and the pressure of the hydrogen and the reaction temperature are likewise constantly controlled and can be adjusted as desired. Furthermore, an important advantage of the apparatus described consists in that the hardening process can be carried out continuously. The degree of hardening can be influenced by carrying out the supply of hydrogen to the individual chambers differentially. The entire process can be performed in a relatively short time, about 30 minutes, whereby the danger of polymerisation is obviated.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

What I claim is:

1. Apparatus for the selective hardening of unsaturated vegetable and animal oils and fats, comprising in combination: an autoclave having partitioning walls for partitioning the space of the autoclave into a plurality of adjacent chambers, said partitioning walls having passage means at predetermined levels for permitting passage of material to be treated from chamber to chamber when the level of the material has reached said passage means, means for conducting material to be treated in longitudinal flow through said chambers, a mixing means outside each chamber, first pipe means connecting said mixing means with said chamber and having an outlet opening below the level of said passage means, second pipe means for supplying hydrogen gas in the form of individual jets to said mixing means, and third pipe means for conveying material from said chamber to the mixing means.

2. Apparatus for the selective hardening of unsaturated vegetable and animal oils and fats, comprising in combination: an autoclave having partitioning walls for partitioning the space of the autoclave into a plurality of adjacent chambers, said partitioning walls having passage means at predetermined levels for permitting passage of material to be treated from chamber to chamber when the level of the material has reached said passage means, means for conducting material to be treated in longitudinal flow through said chambers, mixing means outside said autoclave, a level pipe extending from said mixing means into the respective chamber to a location below said passage means, pipe means for supplying hydrogen gas in the form of individual jets to said mixing means, and further pump operated pipe means for conveying material from said chamber into said mixing means.

3. Apparatus as in claim 2, wherein said mixing means includes a mixing chamber, said hydrogen gas being supplied to said mixing chamber in the form of individual jets through a plurality of small diameter tubes, a stationary impact surface mounted within said chamber in the path of said jets, and conduit means for supplying material into said mixing chamber.

References Cited in the file of this patent

UNITED STATES PATENTS

| | | |
|---|---|---|
| 1,040,531 | Ellis | Oct. 8, 1912 |
| 1,097,308 | Ellis | May 19, 1914 |
| 1,121,860 | Moore | Dec. 22, 1914 |
| 2,134,571 | Morlock | Oct. 25, 1938 |
| 2,536,603 | Holimboe | Jan. 2, 1951 |
| 2,720,447 | Jones et al. | Oct. 11, 1955 |
| 2,762,819 | Bollens | Sept. 11, 1956 |
| 2,903,344 | Rollman et al. | Sept. 8, 1959 |
| 2,927,009 | Stiles et al. | Mar. 1, 1960 |

FOREIGN PATENTS

| | | |
|---|---|---|
| 723,887 | Great Britain | Feb. 16, 1955 |